No. 708,967. Patented Sept. 9, 1902.
S. S. MILLER & L. E. CLOUGH.
MACHINE FOR SMOOTHING RUBBER VEHICLE TIRES.
(Application filed May 14, 1902.)

(No Model.) 4 Sheets—Sheet 1.

Witnesses:

Inventors:
Stephen S. Miller,
Lee E. Clough,
By Humphrey & Humphrey, Attys

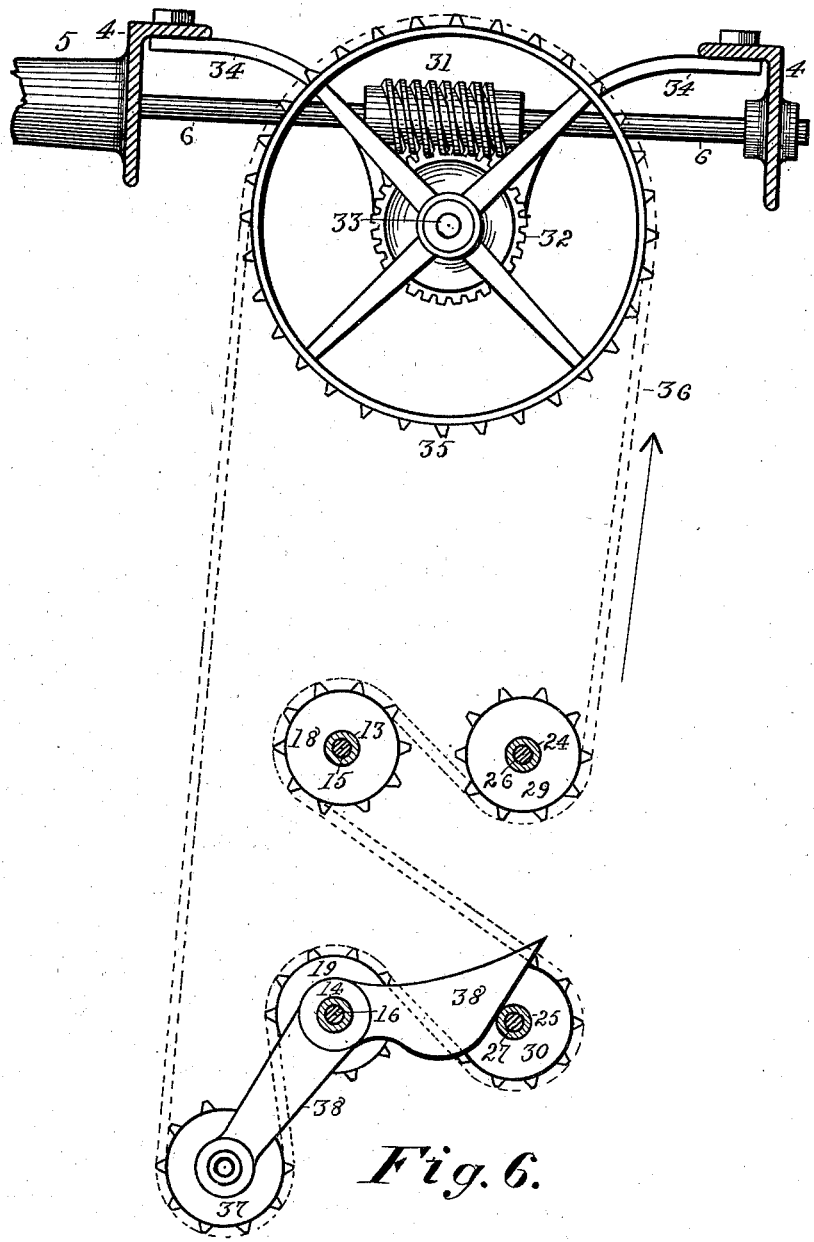

UNITED STATES PATENT OFFICE.

STEPHEN S. MILLER AND LEE E. CLOUGH, OF AKRON, OHIO.

MACHINE FOR SMOOTHING RUBBER VEHICLE-TIRES.

SPECIFICATION forming part of Letters Patent No. 708,967, dated September 9, 1902.

Application filed May 14, 1902. Serial No. 107,374. (No model.)

*To all whom it may concern:*

Be it known that we, STEPHEN S. MILLER and LEE E. CLOUGH, citizens of the United States, residing at Akron, in the county of Summit and State of Ohio, have invented a certain new and useful Improvement in Machines for Smoothing Rubber Vehicle-Tires, of which the following is a specification.

Our invention has relation to improvements in devices for perfecting rubber tires for vehicles of the class named that are vulcanized between oppositely-disposed molds. In the construction of these tires it is found that the tire when vulcanized and removed from the molds has on each side a thin integral projection, technically called a "fin," that must be removed before the tire is in suitable shape or condition for the market or for use, and which fin has to be removed by excision of some kind.

The object of our invention is to provide a machine by which these fins may be quickly removed without the use of a knife, sandpaper, or skilled labor, and the removal of which will leave the surface of the tire at that point practically smooth.

To the accomplishment of the aforesaid object, our invention consists of the peculiar and novel construction, arrangement, and combination of parts hereinafter described, and then specifically pointed out in the claims, reference being had to the accompanying drawings, which form a part hereof.

Figure 1:
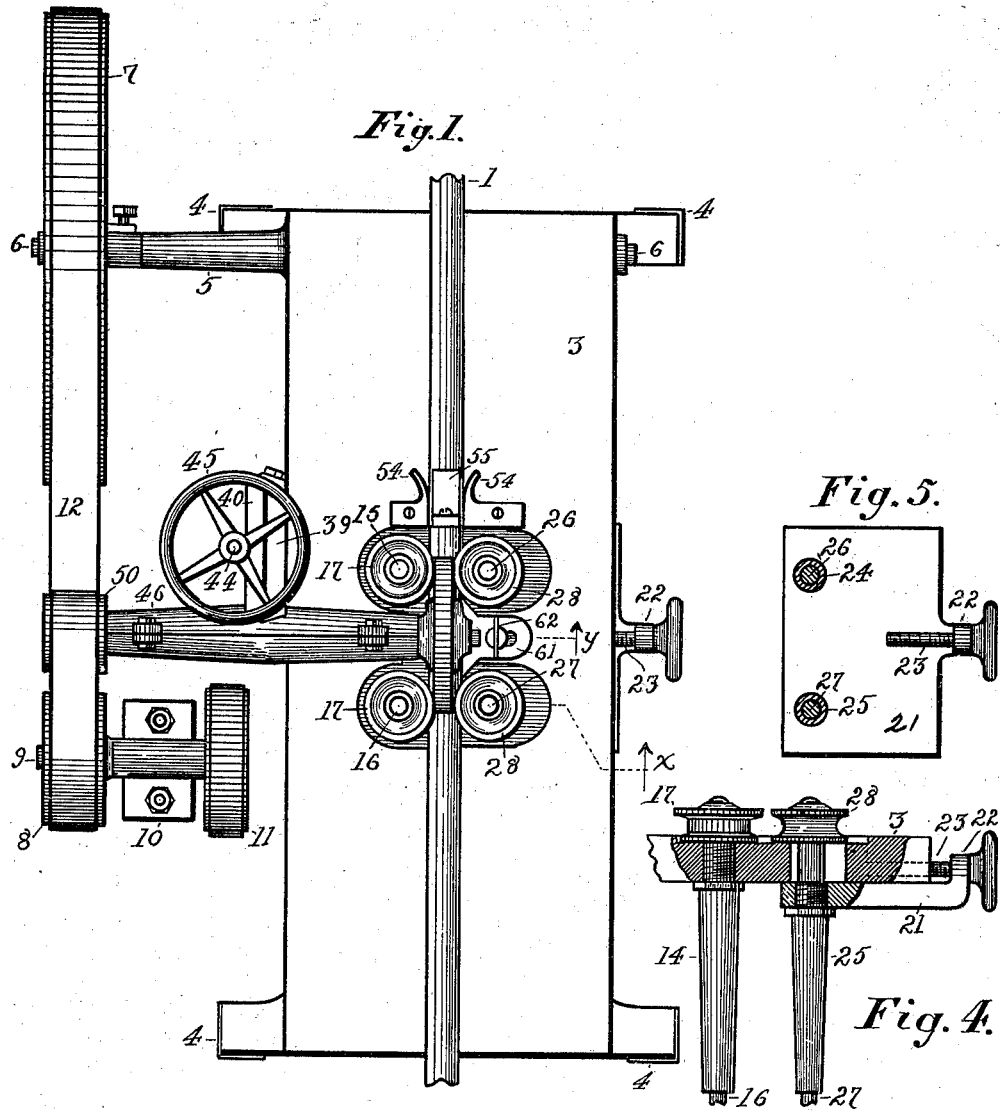
Figure 2:
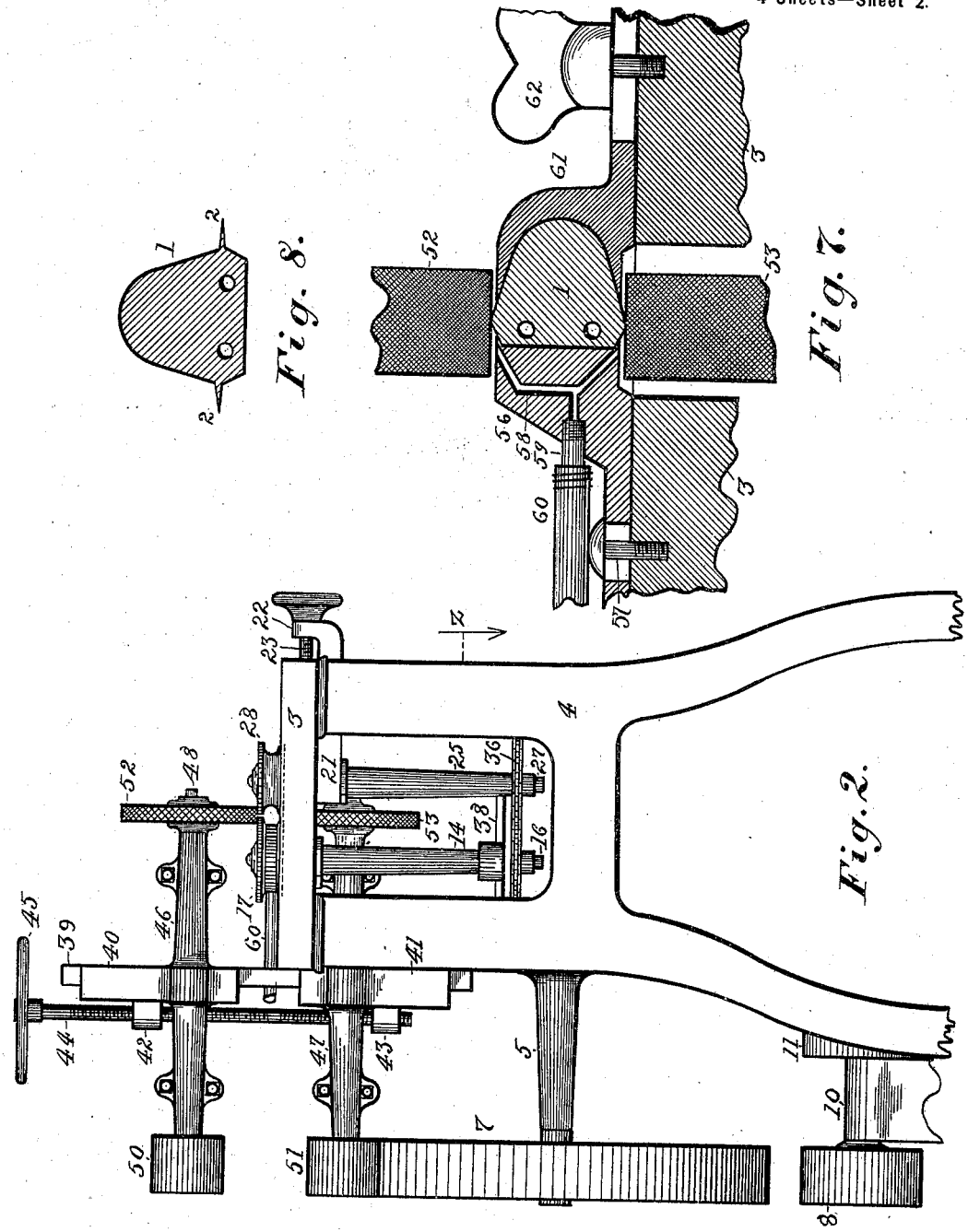
Figure 3:
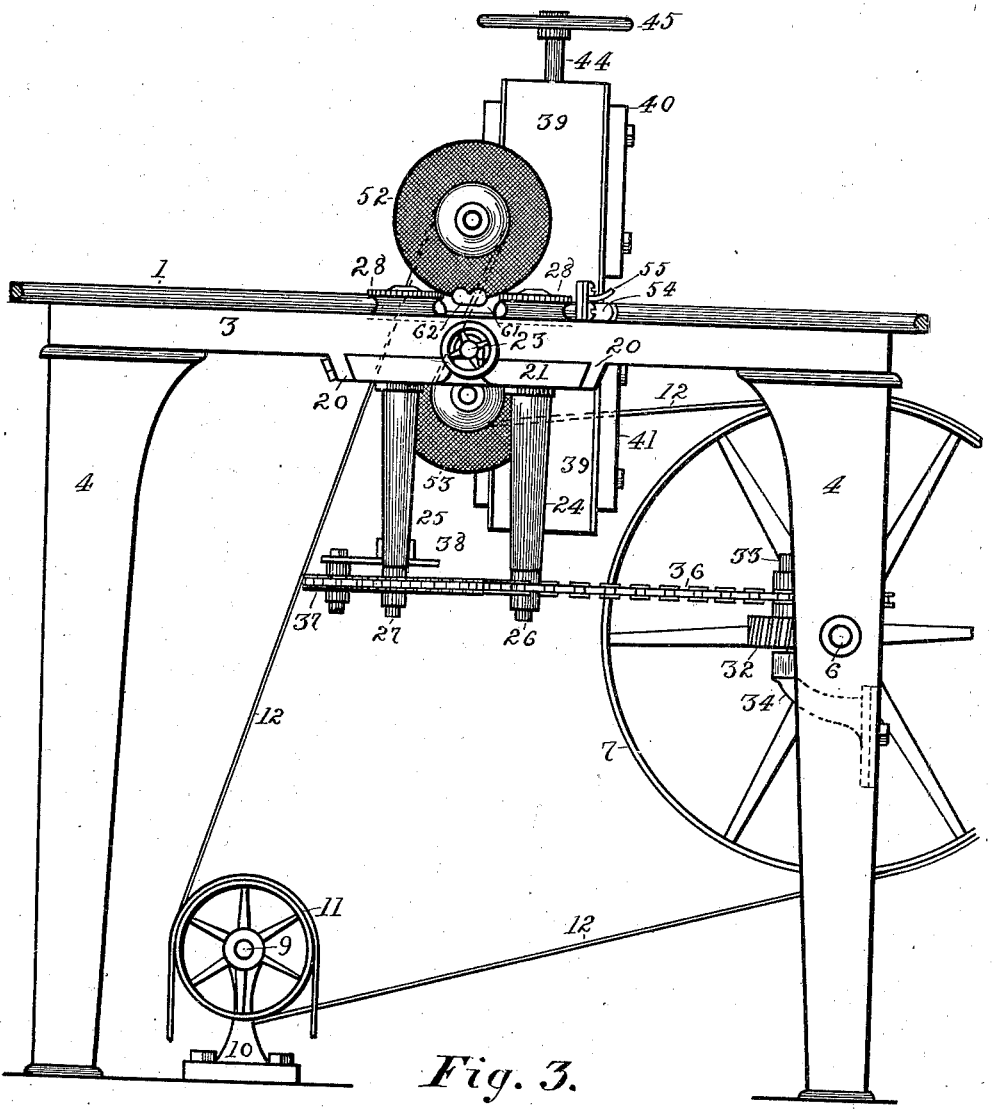

In the accompanying drawings, in which similar reference-numerals indicate like parts in the different figures, Figure 1 is a plan of our machine; Fig. 2, an elevation looking from the bottom of Fig. 1; Fig. 3, an elevation looking from the right of Fig. 1; Fig. 4, a section of a part of the machine at the line *x x* of Fig. 1; Fig. 5, a plan of the plate and screw for moving one pair of feeding and holding rollers; Fig. 6, an enlarged section of Fig. 2 at the line *z*; Fig. 7, an enlarged section of a part of Fig. 1 at the line *y*; and Fig. 8, a section of a tire, showing the fins before being removed.

These tires when they are drawn from the molds have the peculiar features shown in Fig. 8, in which 1 is the tire, and 2 the fins. To accurately remove these, the machine consists of a table 3, supported by end legs 4, projecting from the right pair of which, Fig. 3, and preferably integral therewith is a long journal-bearing 5, in which is journaled a shaft 6, bearing at its outer end a large pulley 7. Oppositely disposed to this pulley 7 is a smaller pulley 8, mounted on one end of a shaft 9, supported on bearings 10, attached to the floor, on the opposite end of which shaft is a pulley 11, to which motion is communicated from any source of power. In practical operation this motion is given by an electric motor under the table; but as any other power may be utilized it has not been deemed necessary to show any definite means.

Depending from the under face of the table 3, on the left of the central line in Fig. 1, are two long bearings 13 and 14, in which are shafts 15 and 16, respectively bearing on their upper ends above the table-top, like grooved pulley 17, and on their lower ends, sprocket-wheels 18 and 19, respectively. Opposite the bearings 14 and 13 on the under face of the table are fixed inclined guides 20, the two forming a dovetailed way, in which is fitted to slide a plate 21, having a raised perforated lip 22, in which is freely mounted, but secured against longitudinal movement therein, a screw 23, having a hand-wheel head by which it may be turned, and the inner end of this screw 23 enters the body of the table 3, by which arrangement the plate 21 may be drawn, when desired, outward, for a purpose to be stated. From the under face of the plate 21 at the right of the central line in Fig. 1 are two long bearings 24 and 25 opposite to and like the bearings 13 and 14, in which are journaled shafts 26 and 27, respectively, bearing at their upper ends grooved pulleys 28 and on their lower ends sprocket-wheels 29 and 30, respectively, similar to the wheels 18 and 19. The wheel-shaft 6 passes under the table from the long bearing 5 to a bearing in the opposite leg, and on the center of this shaft is secured a worm 31, that meshes in a worm-wheel 32 on a vertical shaft 33, supported in brackets 34, secured to the legs. On the upper end of the shaft 33 is a large sprocket-wheel 35, on which runs a sprocket-chain 36, that passes around the nearest sprocket-wheel 24, thence about the opposite sprocket-wheel 18, thence around the wheel 25, thence around the wheel 19, and thence around an "idler" sprocket-wheel 37 to the wheel 35. The idler 37 is mounted in one arm of a lever 38, pivoted on the nearest bearing 14, the other end of which has an inclined face that bears against the nearest bearing 25, depending from the sliding plate 21. The object and purpose of this idler is to prevent the chain being strained as the plate 21 is drawn out or relaxed when the plate is forced inward. As the plate is drawn out it would tend to sustain the chain 36; but the inclined face of the lever 38 follows this movement, thus permitting the end of the lever 38 bearing the wheel 37 to swing toward the large wheel 35 and by the reverse motion of the plate 21 is rocked away from the wheel 35, by which means the same tension is maintained in the chain 36 at all times. At the left side of the table 3 is secured a vertical plate 39, that has its vertical edges beveled from the same side, this forming a dovetailed guide. Fitted to slide on this guide are upper and lower boxes 40 and 41, each having on its back lugs 42 and 43, respectively, each perforated and screw-threaded in opposite directions, in which runs a screw 44, having threads in opposite directions and provided with a hand-wheel 45. These boxes 40 and 41 bear long separable journal-bearings 46 and 47, respectively, in which are mounted arbors 48 and 49, the outer ends of which bear pulleys 50 and 51 and the inner ends clamping-disks to retain grinding or excising-wheels 52 and 53, respectively, arranged to run in substantially the same vertical plane in the space between the rollers 17 and 28. To direct the tire to the action of the wheels 52 and 53, there are secured to the table 3 in the line of approach, as shown on the upper end of Fig. 1, lateral curved guide-blades 54 with an intermediate upwardly-curved blade 55, between which the tire is pushed, and to hold it while being subjected to such action there is adjustably secured to the table, on the left of the tire-space in Fig. 1, a bearing-plate 56, held by a screw 57, as appears in Fig. 7. This plate, as shown in the figure, has a flat vertical face to meet the flat inner periphery of a tire of the form shown; but this shape will be changed to adapt it to any desired cross-section of tire. In this plate is an air-duct 58, terminating near the center of the top and bottom, and the opposite end of this duct connects with a tube 59, to which is attached a larger tube 60, so that the plate 56 may be moved to the right or left without disturbing the pipe 60, the opposite end of which is connected with any preferred device by which a blast of air may be forced through it, the object and purpose of which is to carry away particles of rubber cut off by the wheels 52 53. Opposite the bearing-plate 56 is an adjustable retaining-guide 61, with its inner face conformed to fit that side of the tire and held by a thumb-screw 62.

The machine may have sets of plates 56 and 61 to adapt it to different forms of tire and also different curved pulleys 17 and 28 for a like purpose.

Having thus described our invention, what we claim, and desire to secure by Letters Patent, is—

1. In a machine of the class designated the combination of a supporting-table, feeding guide-rolls mounted on said table to force said tire lengthwise along said table, excising means mounted above and below said table placed to engage said passing tires, substantially as shown and described.

2. In a machine for removing projections from rubber tires, the combination with a supporting-table, of pairs of guide feeding-rolls mounted on said table, means to cause the tires to slide along said table, a portion of said guide feeding-rolls capable of transverse adjustment with relation to said tires and the other rolls and means for removing projections on said tires simultaneously on both sides.

3. The combination in a machine for removing projections from rubber tires, of means for feeding the tires across a table, means for removing projections from said tires simultaneously on both sides, and means for adjusting the relative position of said mentioned means with relation to each other, substantially as shown and described.

4. The combination in a machine for removing projections from tires, of a table to support said tires, a number of pairs of guide feeding-rolls situated in such position on the table as to cause the passage of the tires between the members of each pair, means for increasing or diminishing the space between the members of each pair of rolls, and means mounted on said table for removing the projections from said tires simultaneously on both sides.

5. The combination in a machine for removing the projections from tires, consisting of excising means situated in such position with relation to each other as to bear on opposite sides of the tire simultaneously, feed guiding-rolls mounted in bearings in said table, sprocket-wheels connected with said guide feeding-rolls and a sprocket-chain to cause said guide feeding-rolls to simultaneously revolve.

6. The combination in a machine for removing projections from rubber tires consisting of a supporting-table, excising mechanism mounted on said table in such relative position thereto as to engage the surfaces of tires passing over said table, guide feeding-rolls mounted in bearings on said table, a portion of said guide feeding-rolls capable of adjustment, means for revolving said guide feeding-rolls simultaneously, and means for retaining said last-named means at an even tension at any desired adjustment of said guide feeding-rolls, substantially as shown and described.

7. In a machine for removing projections from rubber tires the combination with a supporting-table, mechanism for removing projections from tires passing over said table, a number of guide feeding-rolls mounted in bearings in said table, sprocket-wheels connected with said guide feeding-rolls, a belt or chain for simultaneously revolving said guide feeding-rolls, a swinging arm, an idler sprocket-wheel mounted on said arm, and means to cause the rocking of said arm to vary the tension on said chain or belt when the position of said guide feeding-rolls is varied with relation to each other, substantially as shown and described.

8. The combination in a machine for removing projections from rubber tires of a supporting-table, excising mechanism situated with such relation to said table as to engage tires passing over said table, guide feeding-rolls mounted in bearings in said table, said guide feeding-rolls adapted to press against one side of the passing tires, a sliding plate mounted in ways in said table, guide feeding-rolls mounted on said plate and capable of movement therewith, sprocket-wheels connected with said guide feeding-rolls, a sprocket chain or belt to cause a simultaneous revolution of said guide feeding-rolls, and means as a swinging arm, an idler sprocket-wheel to maintain the tension of said belt or chain during any adjustment of said sliding plate.

9. Movable guides to receive and permit the passage of tires of the class named having openings for the exposure of the portion of said tires containing "fins" in combination with revoluble grinding-wheels arranged to engage and remove said fins, substantially as shown and described.

10. In a machine for removing projections from rubber tires during their manufacture, the combination of means to support the tires simultaneously on both sides, means to feed said tire along said supporting means, excising means to remove the projections from the tire, and supporting means to retain said tire in normal shape during such excision, substantially as shown and described.

11. In a machine for removing the projections from rubber tires during their manufacture, the combination of means to support the tire, means to feed said tires across said supporting means, means for excising said projections, and supporting means to retain said tire during such excision, and means for forcing a current of air against said excising means, at the point where such excision is taking place, substantially as shown and described.

In testimony that we claim the above we hereunto set our hands in the presence of two subscribing witnesses.

STEPHEN S. MILLER.
LEE E. CLOUGH.

In presence of—
T. C. MARSHALL,
C. E. HUMPHREY.